United States Patent [19]

Glaze et al.

[11] Patent Number: 4,733,578
[45] Date of Patent: Mar. 29, 1988

[54] BEVEL GEAR DIFFERENTIAL WITH CONICAL SPHERICAL GEAR SEATS

[75] Inventors: Jack G. Glaze, Fort Wayne; Terry L. Oster, Auburn, both of Ind.

[73] Assignee: Dana Corporation, Toledo, Ohio

[21] Appl. No.: 947,982

[22] Filed: Dec. 31, 1986

[51] Int. Cl.⁴ ............................ F16H 1/40; F16H 1/39
[52] U.S. Cl. ......................................... 74/713; 74/710
[58] Field of Search ................................... 74/713, 710

[56] References Cited

U.S. PATENT DOCUMENTS

| | | | |
|---|---|---|---|
| 2,016,343 | 10/1935 | Oberein | 74/713 |
| 2,061,009 | 11/1936 | Rothrock | 74/713 |
| 2,460,295 | 1/1949 | Keese | 74/713 X |
| 2,924,125 | 1/1960 | Brandon | 74/713 |
| 3,470,768 | 10/1969 | Ford et al. | 74/713 |
| 4,018,097 | 4/1977 | Ross | 74/713 X |
| 4,541,306 | 9/1985 | Hokusho et al. | 74/713 |
| 4,543,853 | 10/1985 | von Hiddessen et al. | 74/713 |

*Primary Examiner*—Dirk Wright
*Attorney, Agent, or Firm*—MacMillan, Sobanski & Todd

[57] ABSTRACT

A tandem axle assembly includes an interaxle differential mechanism coupled to divide power between two separate axle differential assemblies. Each axle differential assembly includes a pair of pinion gears having spherical gear seats and a pair of side gears having conical gear seats. Each axle differential assembly is rotatably supported within a housing by a pair of tapered roller bearings. The outer race of each bearing is located within an end of a differential case, while the inner race is positioned on a reduced diameter hub of a bearing retainer threaded into an opening in the housing. The opening in the housing is sized such that the bearing retainer having the inner race and an associated roller cage assembly thereon can be inserted therethrough during the assembly process. Also, the interaxle differential includes a separate lubricant sump for providing lubrication to the interaxle differential upon initial start-up conditions. One of the interaxle differential side gears is disk-shaped, and includes internally formed side gear teeth in a planar rear face, internally formed clutch teeth in a planar front face, and external teeth around the radial periphery.

11 Claims, 7 Drawing Figures

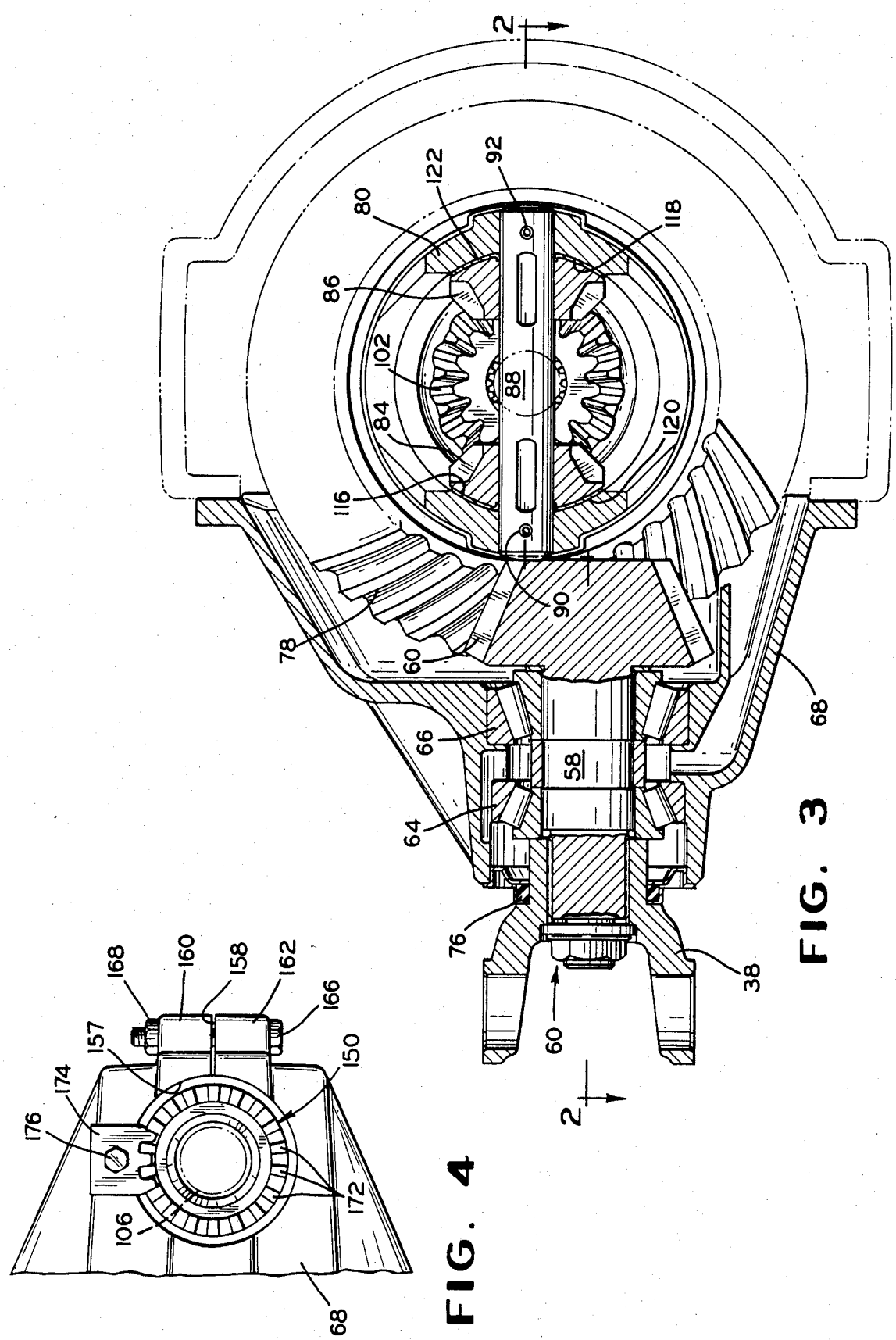

BEVEL GEAR DIFFERENTIAL WITH CONICAL SPHERICAL GEAR SEATS

BACKGROUND OF THE INVENTION

The present invention relates generally to the field of vehicular differential mechanisms and, in particular, to a compact differential mechanism which is rotatably supported within an associated housing by an inverted bearing arrangement.

Differential mechanisms are typically provided in vehicles for transmitting power from a single drive shaft to two separate axle shafts coupled to respective wheel assemblies. While differential mechanisms have been used for a long time and many various designs have been proposed, there is a continuing effort being made to improve the construction of a differential mechanism in order to reduce its weight, improve its durability and operating characteristics, and simplify its method of manufacture and assembly.

For example, U.S. Pat. No. 4,541,306 to Hokusho et al. discloses a differential mechanism wherein the pinion and side gears are all supported in spherical seats, and the center of the spherical seat of each side gear is offset from the center of the pinion gear seats. This construction produces a more compact differential mechanism.

Various structures have been proposed for rotatably supporting a differential case within an associated housing. For example, in the above mentioned patent to Hokusho et al., inner races of a pair of tapered roller bearings are located on a hub portion of the differential case, while the outer races of the bearing are supported by the associated housing.

Inverted bearing arrangements have also been proposed. In U.S. Pat. No. 2,061,009 to Rothrock, the outer races of the bearings are supported within annular recesses formed in the ends of the differential case, while the inner races are positioned on hub portions of bearing retainer members threaded into the associated housing.

Also, various types of gear seat configurations have been proposed for supporting the back face of the associated differential gears. For example, U.S. Pat. Nos. 3,470,768 and 4,543,853 disclose gear seat configurations different from the above mentioned patents to Hokusho et al. and Rothrock.

SUMMARY OF THE INVENTION

The present invention relates to a unique differential assembly construction wherein the pinion gears of the differential mechanism have spherical back surfaces which are received within corresponding spherical pinion gear seats provided in a differential case. Further, the differential mechanism includes at least two side gears having conical back surfaces which are received and supported within conical gear seats provided in the differential case. In the preferred embodiment of the invention, the maximum spacing between the back surfaces of the side gears along the axis of rotation of the side gears is less than the maximum spacing between the back surfaces of the pinion gears along the axis of rotation of the pinion gears. It has been found that such a structure reduces the overall axial width of the differential case, while providing an advantageous support structure for the associated differential gears.

The present invention also concerns a unique structure for rotatably supporting the differential case, and a unique method for assembling the differential mechanism within an associated housing. In particular, the differential case is rotatably supported relative to a housing by a pair of tapered roller bearings. Each roller bearing includes an inner race, an outer race, and an intermediate roller cage assembly. The differential case is provided with annular recessed mounting portions in each end thereof for receiving a respective one of the outer races. The housing is provided with a pair of spaced apart and aligned internally threaded bores. A separate bearing retainer having a reduced outer diameter hub portion receives and supports the inner race and roller cage assembly of the respective bearing. The bearing retainers include externally threaded portions for engagement with the internally threaded bore holes in the housing. In accordance with the present invention, the internally threaded bore in the housing has a diameter at least as great as the maximum outer diameter of the roller cage assembly. Such a structure facilitates the assembly of the differential unit.

Initially, the inner races of the roller bearings are pressed onto the hub portions of the bearing retainers. Next, the outer races of the roller bearings are pressed into the arcuate recesses formed in the differential case. Then, the differential case having the outer races mounted thereon is inserted into the associated housing. Next, the hub portions of the bearing retainers having the inner races and the associated roller cage assemblies mounted thereon are passed through the bores in the housing to bring the roller cage assemblies into engagement with the respective outer races as the bearing retainers are screwed into the housing. Finally, the bearing retainers are adjusted to provides the proper preload on the bearings and backlash in the hypoid gear set, and means are provided for locking each bearing retainer in a selected position.

The above, as well as other advantages of the present invention, will become readily apparent to one skilled in the art from reading the following detailed description of the preferred embodiment of the invention in conjunction with the attached drawings.

BRIEF DESCRIPTION OF THE DRAWINGS

FIG. 3 is a sectional view of the rear differential of FIG. 2 taken along the lines 3—3 in FIGS. 1 and 2;

FIG. 4 is a side elevational view taken along line 4—4 in FIG. 2, and showing the bearing retainer locking means utilized with the invention;

DESCRIPTION OF THE PREFERRED EMBODIMENT

Figure 1:
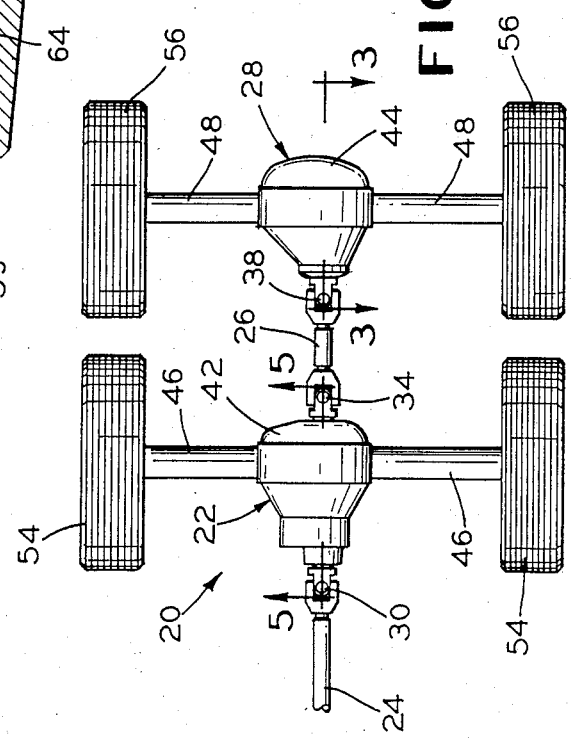
FIG. 1 is a top plan of a tandem axle assembly which incorporates, the features of the present invention.

Turning first to FIG. 1, there is shown a tandem rear axle assembly 20 including an interaxle front differential 22 driven through a drive shaft 24 and driving an intermediate drive shaft 26, which in turn drives a rear differential 28. Since both differentials 22 and 28 are adapted to drive rear wheels, the differential 22 is sometimes referred to as a "front-rear" differential, while the differential 28 is referred to as a "rear-rear" differential. It will be appreciated that the features of the invention may be applied to various types of differentials, including a two-speed differential mechanisms and a single axle differential mechanism.

As illustrated, the interaxle front differential 22 is driven at its input yoke 30 by a conventional universal joint assembly, and drives the intermediate drive shaft 26 through an output yoke 34, connected to the front end of the intermediate drive shaft 26 by a universal joint assembly. The rear end of the drive shaft 26 is coupled to drive the rear differential 28 at an input yoke 38 by a universal joint assembly. The differentials 22 and 28 include outer housings 42 and 44 having integral axle housing portions 46 and 48 which in turn support the respective rear wheel assemblies 54 and 56.

Figure 2:
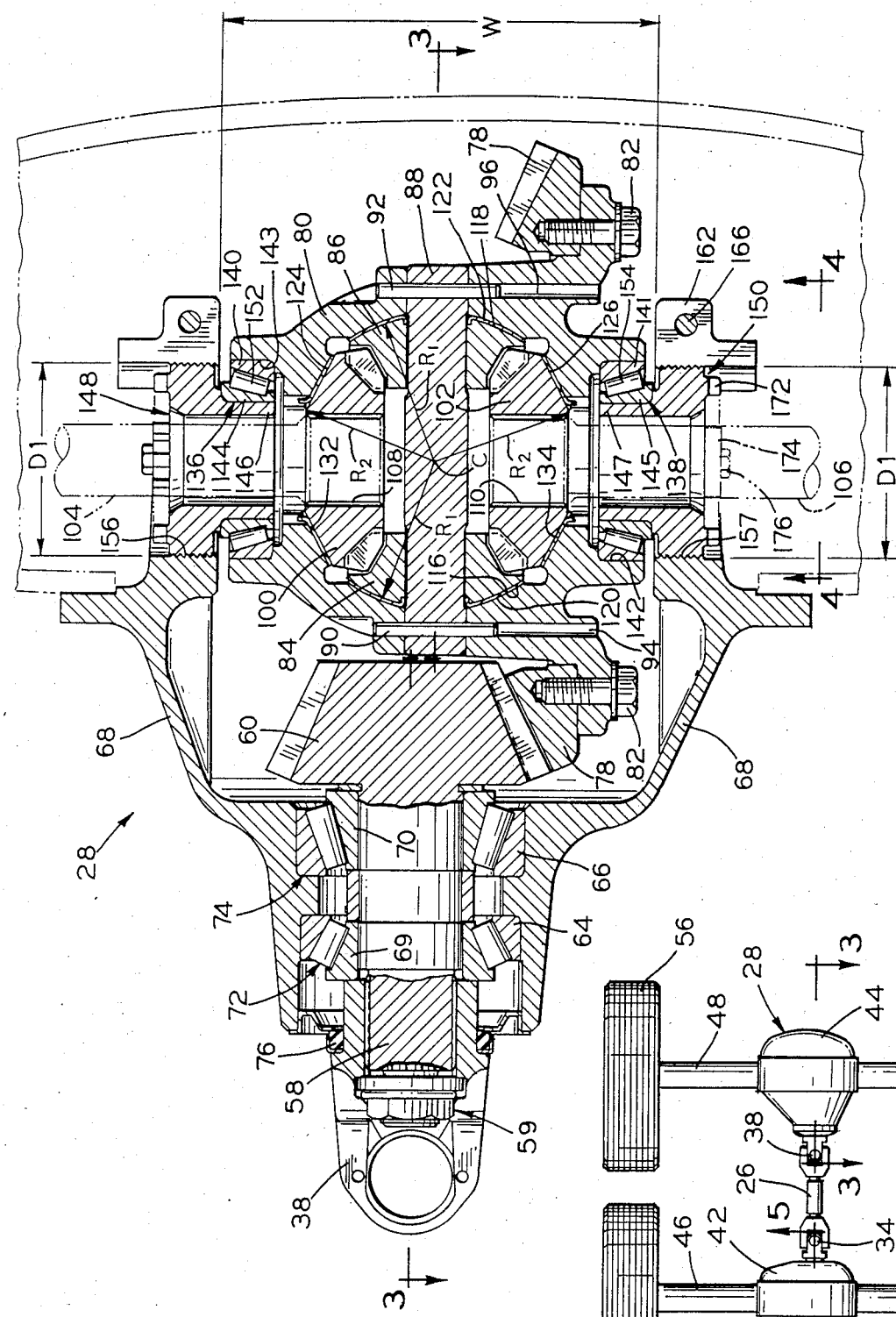
FIG. 2 is a sectional view of the rear differential of the tandem axle assembly of FIG. 1, taken along the line 2—2 in FIG. 3.

Turning now to FIG. 2, there is shown a top sectional view of the single rear differential 28. As illustrated, the input yoke 38 is fastened to the forward end of an input pinion shaft 58 by a fastening means 59, shown as a nut and washer fastened to a threaded stud integral with the shaft 58. The rear end of the input shaft 58 carries an input pinion gear 60. The shaft 58 is rotatably supported within a differential housing 68 by a pair of opposed tapered roller bearing assemblies 72 and 74. The roller bearing assemblies have respective outer races 64 and 66 which are fixed with respect to the differential housing 68. The bearing assemblies have inner races 69 and 70 which are fixed with respect to the shaft 58. A conventional annular seal means 76 is provided at the forward end of the input shaft 58 between the yoke 38 and the housing 68.

In a conventional fashion, the input pinion gear 60 drives a ring gear 78 which is fastened to a differential gear case or casing means 80 by a plurality of bolts 82. The differential gear case 80 defines a chamber for receiving a pair of spaced apart differential pinion gears 84 and 86. The pinion gears 84 and 86 are rotatably supported on a shaft 88 secured to the case 80 by pins 90 and 92 which are located in bores 94 and 96, and pass through corresponding apertures in the ends of the shaft 88.

A pair of side gears 100 and 102 mate with pinion gears 84 and 86 and are respectively splined to the inner ends of axle shafts 104 and 106 (shown in phantom) at splined portions 108 and 110. The pinion gears 84 and 86 have respective spherical faces 116 and 118 which are received in corresponding spherical seats formed in the case 80. Spherical thrust washers 120 and 122 are positioned between the spherical pinion gear faces 116 and 18 and the respective spherical seats. The spherical faces 116 and 118 and the associated spherical seats are defined by spherical surfaces of radius $R_1$ having a generating center point (Pt.C) lying on the axis of rotation of the pinion gears 84 and 86.

To reduce the width and weight of the differential mechanism, the side gears 100 and 102 are provided with conical faces 124 and 126, which are symmetrical, and have an axis of generation aligned with the axis of rotation of the gears 100 and 102. These conical faces are received in respective conical seating areas formed in the case 80. Conical thrust washers 132 and 134 are positioned between the conical gear faces 124 and 126 and the respective conical seating areas. In order to reduce the overall axial width of the differential, the conical seats are preferably formed such that the distance $R_2$ (shown in FIG. 2) from point C to the portions of the conical surfaces adjacent the splined portions 108 and 110 is less than the radius $R_1$. This results in the maximum spacing between the back surfaces of the side gears along the axis of rotation of the side gears being less than the maximum spacing between the back surfaces of the pinion gears along the axis of rotation of the pinion gears. However, it will be appreciated that, in some instances, it may be desirable to have the radius $R_1$ be less than the radius $R_2$.

The differential gear case 80 is rotatably supported within the differential housing 68 by a pair of tapered roller bearings 136 and 138. The bearings 136 and 138 have respective outer races 140 and 141 which are press fit within annular recesses 142 and 143 formed in the ends of the case 80, and inner races 144 and 145 which are press fit over inner hub portions 146 and 147 of externally threaded bearing retainers 148 and 150. The inner races 144 and 145 carry bearing roller cages 152 and 154 respectively.

Turning now to FIGS. 2 and 4, there is shown a means for securing the bearing retainers 148 and 150 in a selected adjusted position. As illustrated, the differential housing 68 defines axially aligned spaced apart threaded bores 156 and 157 for the reception of the bearing retainers 148 and 150. The bores 156 and 157 are formed of a diameter D1 which is greater than the outermost diameter of the bearing roller cages 152 and 154. As will be discussed below, this greatly facilitates the assembly of the differential mechanism by enabling the retainers 148 and 150 to be inserted in the respective threaded bores with the associated inner races and bearing cages mounted thereon.

As shown in FIG. 4, the housing 68 is split at a line 158, which terminates at the threaded bore 157. The housing 68 is provided with projections 160 and 162 defining the split line 158. The projections 160 and 162 are provided with colinear apertures for retaining a clamping bolt 166, which is fastened with a nut 168. By adjusting the clamping bolt 166, the threaded bore 157 may be tightened around the threaded bearing retainer 150 in a preliminary manner to prevent the unintended movement of the bearing retainer 150 as the bearing 138 is being adjusted. As a final step after the bearing 138 has been adjusted, the bolt 166 can be tightened to close the split line 158.

In addition, the bearing retainer 150 has an annular toothed or castellated portion defining a plurality of outwardly extending teeth 172. A fingered locking plate 174 (shown in FIG. 4) engages at least two of the teeth 172 and is rigidly affixed to the housing 68 by means of a bolt 176 engaging a corresponding threaded bore in the housing 68. In this manner, the bearing retainer 150 may be adjusted in a stepwise manner under an appropriate amount of drag caused by the adjustment of the bolt 166 and, when appropriate adjustment is achieved, the fingered locking plate 174 is applied and fixed in position and the clamping bolt 166 is further tightened, yielding two separate and cooperating means for keeping the bearing retainer from becoming misadjusted during a long-extended service life. It will be appreciated that, in some instances, either the clamping bolt 166 or the locking plate 174 can be eliminated, and only a single means can be used to lock the bearing retainers. The other bearing retainer 148 can be provided with a similar adjusting and locking structure.

The method of assembling the differential gear case 80 and the bearings 136 and 138 is greatly facilitated by the structure of the present invention. Initially, the inner races 144 and 145 having the associated roller cages 152 and 154 mounted thereon are pressed onto the reduced diameter hub portions 146 and 147 of the respective bearing retainers 148 and 150. The respective bearing rollers 152 and 154 are maintained on the associated inner races as assemblies by conventional bearing cage members. Then, the outer races 140 and 141 are pressed into the annular recesses 142 and 143 in the ends of the differential gear case 80.

Next, the differential case 80 is inserted into the open rear end of the housing 68, with the ring gear 78 engaging the input pinion gear 60. As illustrated in FIG. 2, the overall width of the differential case 80 is less than the width W of the opening provided in the rear end of the housing 68. Following this, the inner ends of the bearing retainers 148 and 150 having the bearing cages 152 and 154 mounted thereon are passed through the respective threaded bores 156 and 157 and seated within their respective outer races 140 and 141 as the bearing retainer means 148 and 150 are screwed into the threaded bores 156 and 157.

The adjustment of the bearing retainers 148 and 150 centers the case 80, and determines the proper engagement of the ring gear 78 and the input pinion gear 60, as well as establishing the proper preload on the bearings 136 and 138. After the proper engagement of the ring gear 78 and the input pinion gear 60 is established in the usual manner, the bearing retainers 148 and 150 can be locked in position.

Figure 5:
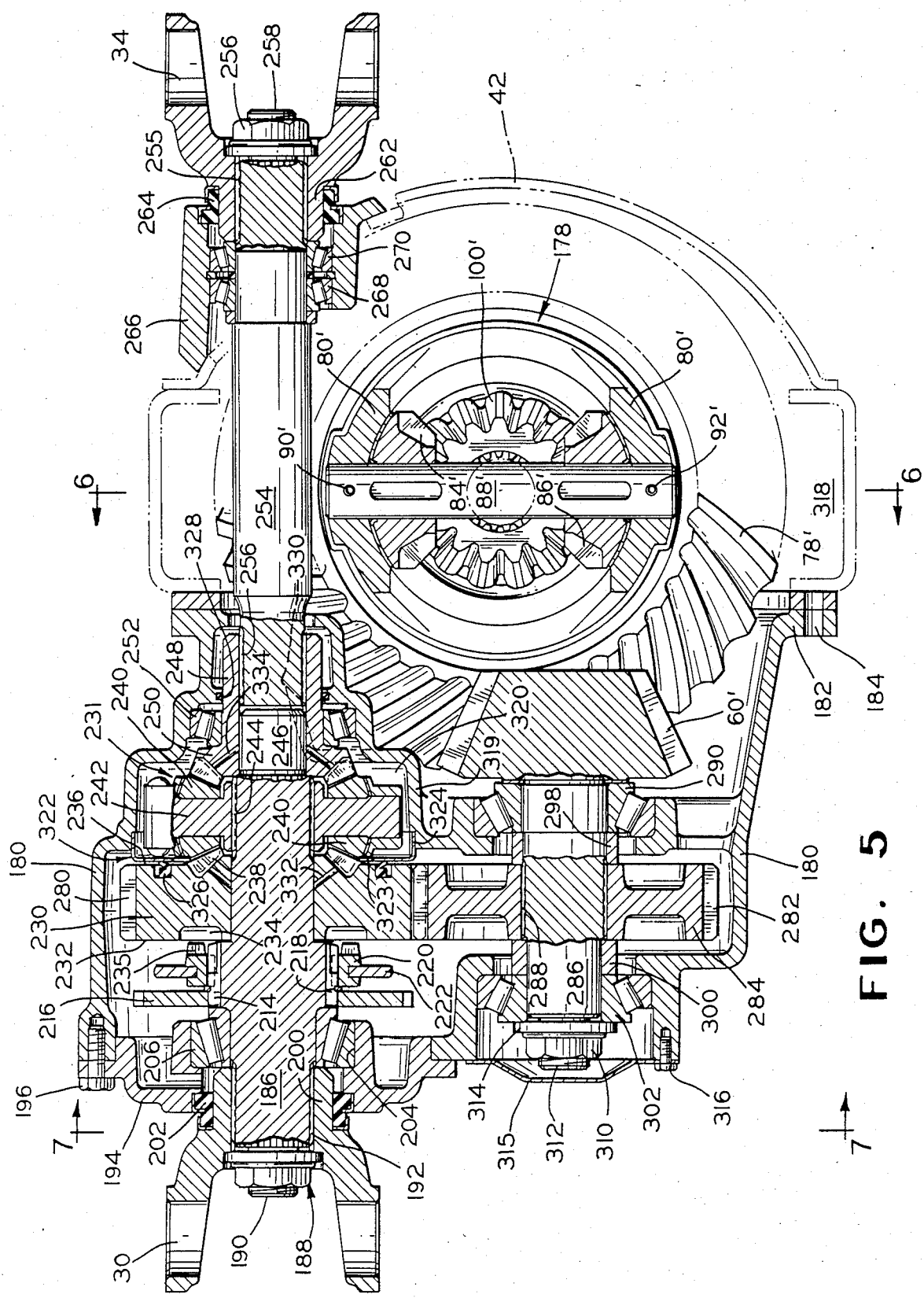
FIG. 5 is a sectional view of the interaxle front differential of FIG. 1, taken along the lines 5—5 in FIGS. 1 and 6.
Figure 6:
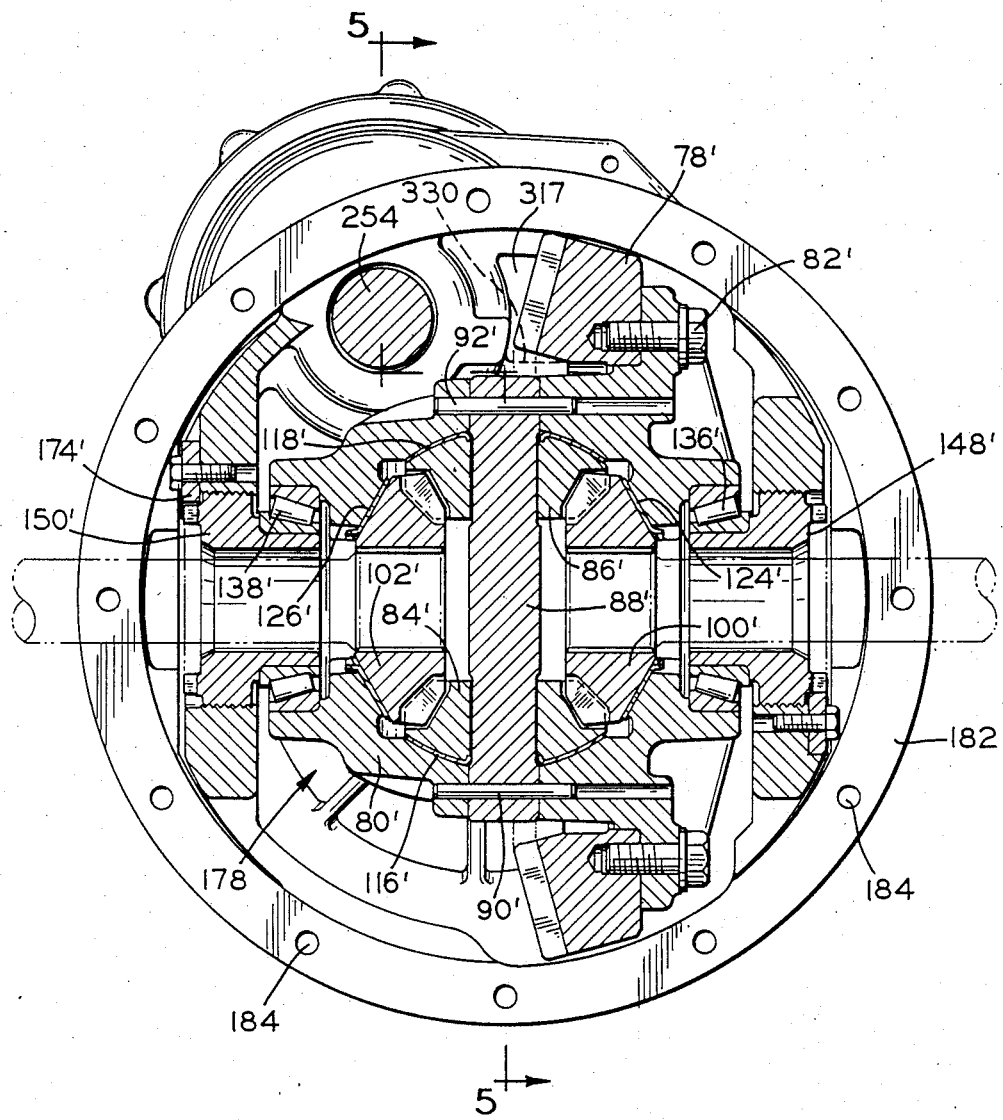
FIG. 6 is a sectional view of the interaxle differential assembly of FIG. 5, taken along the line 6—6 in FIG. 5.
Figure 7:
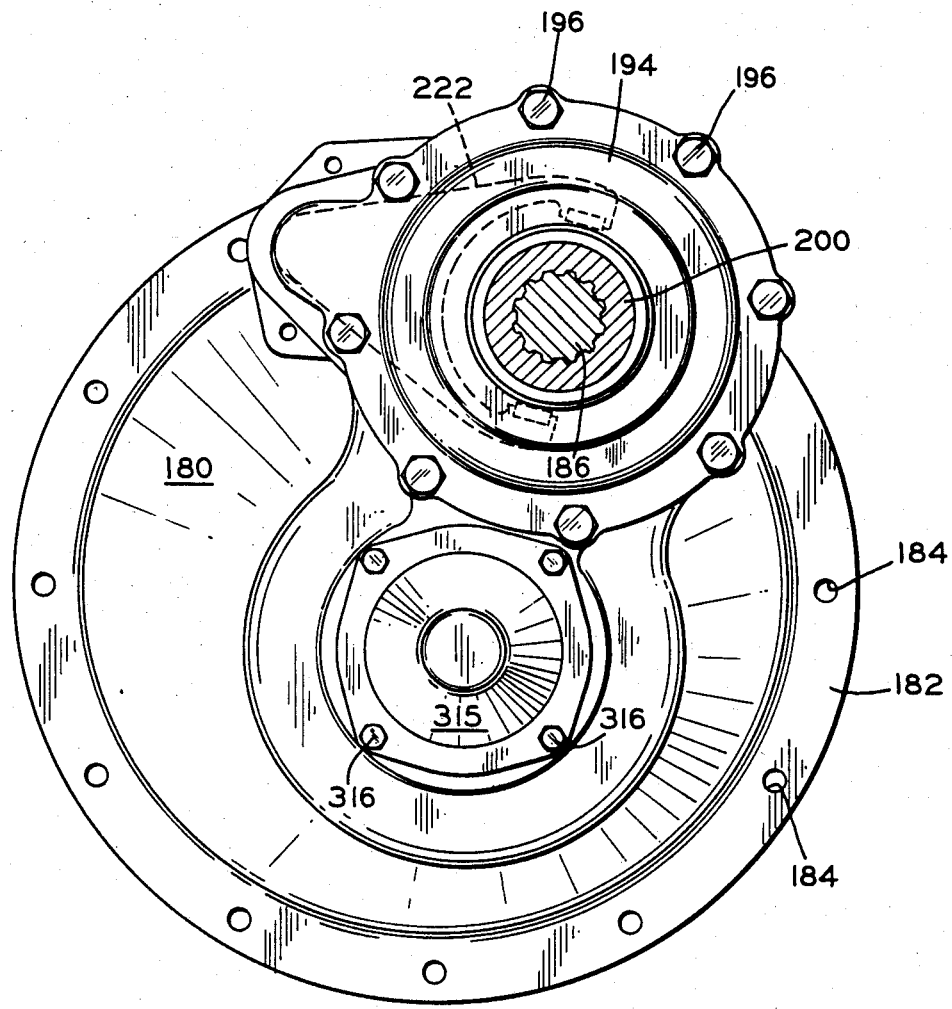
FIG. 7 is a sectional end view of an interaxle differential assembly according to the invention taken along the line 7—7 in FIG. 5.

As will be appreciated, many of the features shown in the rear differential 28 of FIGS. 2 and 3 are also utilized in the interaxle front differential 22 illustrated in FIGS. 5-7. For example, in FIGS. 5 and 6, a differential mechanism 178 used to drive the wheels 54, the bearing structure utilized to support the differential mechanism 178, and the method of installing the differential mechanism within the associated housing can all be similar to that of the rear differential 28. Thus, to simplify the description, components in the front differential 22 similar to those in the rear differential 28 will be identified by similar, but primed, reference numerals such as pinion gear 60'.

As shown in FIG. 5, the interaxle front differential 22 includes a main housing 180 which defines a flange section 182 having a plurality of bolt holes 184 formed therein for bolting the housing 180 onto the housing 42. The input yoke 30 is fastened to an input shaft 186 by a nut and washer assembly 188 applied to a threaded stud 190 integral with the shaft 186. The input yoke 30 is rotationally interlocked to the input shaft 186 by mating splines 192. An input cap 194 ( also shown in FIG. 7) is bolted to the housing 180 by bolts 196. The input cap 194 is provided with an aperture into which an inner collar 200 of the yoke 30 extends. An annular seal means 202 is positioned between the cap 194 and the yoke collar 200. Also, the cap 194 includes an annular recessed 2mounting surface 204 for receiving a tapered roller bearing 206 which rotatably supports the front end of the shaft 186.

The shaft 186 includes an intermediate splined portion 214 which carries a gear 216 which, if desired, can be used to drive an oil pump (not shown) attached to an external portion of the housing 180. The gear 216 is preferably installed next to a snap ring 218 which serves to locate the gear 216. A dog clutch ring 220 having internal splines engageable with the splined portion 214 is moveable axially along the splined portion 214 by a shifting fork 222 (also shown in FIG. 7) which engages an annular groove formed in the clutch ring 220. The shift fork 222 can be actuated in a conventional fashion such as by a solenoid, for example.

As shown in FIG. 5, a disk-shaped gear 230, which is one component of an interaxle differential 231, is freely rotatably mounted on the shaft 186. The gear 230 has a first front planar surface 232, having a plurality of circumferentially spaced, inset dog clutch teeth 234 for selective engagement with external teeth 235 on the clutch ring 220. The gear 230 has a second rear planar surface 236 opposite the surface 232, and which defines a plurality of inset side gear teeth 238 for engagement with a set of four differential pinion gears 240 (only two shown in FIG. 5). It will be appreciated that both the dog clutch teeth 234 and the side gear teeth 238 are formed inwardly of their respective planar surfaces 232 and 236. It has been found that such a construction reduces the overall axial length of the interaxle differential mechanism as compared with prior art assemblies.

The pinion gears 240 are rotatably mounted on a pinion gear carrier 242, which is fastened to the shaft 186 at a second mating rear splined portion 244. The shaft 186 has a bearing end 246 which is received in an aperture in a neck portion 248 of a side gear 250. The side gear 250 is rotatably mounted in the housing 180 by a bearing 252, and engages the teeth of the pinion gears 240. The side gear 250 and a second output shaft shown as an output shaft 254 are interconnected through the neck portion 248 by mating splines 256.

The rear end of the shaft 254 is mounted to the output yoke 34 by mating splines 255, and is secured thereto by means of a nut 256 fastened to a threaded stud 258 integral with the shaft 254. The yoke 34 includes a collar portion 262, adjacent the mating spline section 255, which passes through an annular seal means 264 into a rear housing 266. The rear housing portion 266 is fastened to the differential housing 42. The rear end of the shaft 254 is rotatably supported within the housing 266 by opposed tapered roller bearings 268 and 270.

The disk-shaped gear 230 also carries radial peripheral gear teeth 280 for engagement with teeth 282 of an output gear shown as the gear 284. The gear 284 is non-rotatably affixed to a first output shaft shown as the pinion shaft 286 by mating splines 288. The rearmost end of the shaft 286 carries the pinion gear 60', corresponding to the pinion gear 60 of FIGS. 2 and 3. A tapered roller bearing 290 rotatably supports the rear end of the shaft 286 relative to the housing 180. A spacer ring 298 is interposed between the inner race of the bearing 290 and the gear 284. A second spacer 300 is interposed between the gear 284 and an inner race of a tapered roller bearing 302 which rotatably supports the front end of the shaft 286. The pinion shaft 286 is pre-loaded by means of a nut 310 fastened to a threaded stud 312 integral with the shaft 286. The nut 310 presses a washer 314 against the inner race of the bearing 302. This adjustment may be made after initial assembly and before the installation of a cover 315. The cover 315 is mounted by bolts 316 to the housing 180. A plan view of the cover 315 is best seen in FIG. 7.

Thus, as best illustrated in FIG. 5, when the drive shaft 24 is rotated, rotating the input yoke 30, the pinion carrier 242 is rotated. This causes the interaxle differential mechanism 231 to divide the power provided by the drive shaft 24 between the side gear 250 and the disk shaped gear 230. The gear 230 acts through the gear 284 and the pinion gear 60' to drive a ring gear 78' of a single axle differential mechanism, having a structure similar to the differential assembly of FIGS. 2 to 4. The power applied to the side gear 250 passes through the shaft 254 to the output yoke 34, which drives the intermediate drive shaft 26. The intermediate drive shaft 26 drives the input yoke 38 of the single rear differential shown in FIGS. 2 and 3, so that each of the four wheel assemblies of the wheel assemblies 54 and 56 may rotate at different speeds as required by cornering and uneven road conditions.

However, when the teeth 235 of the dog clutch ring 220 are slid into engagement with the teeth 234 of the disk-shaped gear 230, the gear 230 becomes locked to the shaft 186. With the pinion carrier 242 also non-rotatable with respect to the shaft 186, the interaxle differential mechanism 231 forms a solid connection between the input yoke 30 and the output yoke 34, so that the two wheel assembly pairs 54 and 56 cannot operate at different average speeds. This is advantageous when the traction of the wheel assemblies 54 and 56 to the ground or supporting surface is marginal.

In operation of an interaxle differential assembly, when the associated vehicle is moving, the rotation of the ring gear 78' causes lubricating oil (not shown) in a main oil sump 318 to be flung towards the area of the interaxle differential mechanism 231 through an opening 317 (shown in FIG. 6), thus lubricating the interaxle differential and also lubricating all bearings that are above the normal level of lubricating oil in the main oil sump 318. However, as is conventional, and as illustrated, rolling elements are not interposed between the pinion gear carrier 242 and the pinion gears 240 or between the input shaft and the interaxle differential input side gear, so that these elements may move with rubbing friction for a very brief period of time when the associated vehicle first begins to move after a lengthly stopped period. Because of this, these components are considered wear parts which must be replaced, although at quite infrequent intervals. In response to this problem, interaxle differential assemblies have been provided with separate lubricating pumps externally mounted to provide start-up lubrication. Although such a lubricating pump may be used with the interaxle differential of the present invention, it is not necessary because of the provision of a simple, yet effective, secondary lubricant sump which will now be discussed.

Referring to FIG. 5, it can be seen that the housing 180 includes an internal support portion 319 which extends below the interaxle differential mechanism 231 and is used to support the outer races of the bearings 252 and 290. The portion 319 also functions to partially enclose the lower half of the interaxle differential mechanism 231 in the area 320. However, as will be appreciated, without the present invention, lubricating oil which normally enters the area 320 by means of the ring gear 78' would drain back into the main sump 318.

The function of a separate secondary lubricant sump for the interaxle differential 231 may be accomplished by providing an apertured cup member 322 partially enclosing the pinion carrier 242. The cup member 322 has a centrally located aperture 323 formed therein through which the shaft 186 extends, and an outer annular lip 324 secured to the internal support portion 319. The aperture 323 also provides clearance for the teeth of the pinion gears 240 and the teeth 238 of the disk-shaped gear 230. The secondary lubricant sump formed by the addition of this apertured cup member 322 is sealed by an annular lip seal means 326 disposed in an annular groove in the rear face of the disk-shaped input gear 230, and in sealing contact with the front surface of the apertured cup member 322. Thus, when operation of the vehicle causes the rotation of the ring gear 78' to throw lubricating fluid into the area of the interaxle differential, it will be trapped in the lubricant sump 320 defined by the internal support portion 319 of the housing 180, the apertured cup member 322, the lip seal 326, and the disk-shaped gear 230.

Also, in FIG. 5, an O-ring 328 is positioned within an annular groove formed in the housing 180 for sealingly contacting the neck portion 248 of the side gear 250. In the embodiment shown in FIG. 5, the level of oil in the secondary lubricant sump 320 will be limited by the lowermost portion 330 of the opening 317 through which the oil is flung by the ring gear 78'. Thus, with the present invention, start-up lubrication will be provided to the interaxle differential 231 the next time the associated vehicle is moved.

To further assist in the lubrication of the interaxle differential, the disk-shaped side gear 230 is provided with a plurality of circumferentially spaced oil passageways 332 which extend from the side gear teeth 238 to the inner bore provided in the gear 230. Similarly, the side gear 250 is provided with oil passageways 334 which extend from the respective side gear teeth to the associated inner bore area. It has been found that, when operating, the rotating pinion gears 240 produce a pumping action which forces oil through the passageways 332 and 334 and into the inner bore areas of the gears 230 and 250. Thus, additional lubricating oil is provided between the inner bore surfaces of the gears 230 and 250 and the corresponding contacting outer surface portions of the shaft 186.

It will be appreciated that numerous modifications and variations of the disclosed embodiments of the invention may be easily made by one skilled in the art without departing from the spirit and scope of the claimed invention.

What is claimed is:

1. A differential assembly comprising:
    a casing means adapted to be rotatably driven about an axis of rotation and defining a chamber therein;
    at least two pinion gears retained within said chamber and having an axis of rotation perpendicular to and interesting the axis of rotation of said casing means;
    at least two side gears retained within said chamber and having an axis of rotation parallel to the axis of rotation of said casing means, said side gears engaging said pinion gears to form a differential gear mechanism, each of said side gears being mounted on and operatively connected to a separate shaft member;
    each of said pinion gears having a back surface defined by a spherical surface having a generating center point lying on the axis of rotation of said pinion gear;
    each of said side gears having a back surface defined by a single conical surface extending substantially from the teeth thereof to the respective shaft member and having an axis of generation aligned with the axis of rotation of said side gears;
    said chamber in said casing means defining at least two spherical surface portions adapted to receive and support said back surfaces of said pinion gears; and said chamber further defining at least two conical surface portions adapted to receive and support said back surfaces of said side gears.

2. The differential assembly according to claim 1 wherein the maximum spacing between the back surfaces of said side gears along the axis of rotation of said side gears is less than the maximum spacing between the back surfaces of said pinion gears along the axis of rotation of said pinion gears.

3. The differential assembly according to claim 1 wherein said casing means is rotatably supported in a housing means by a pair of tapered roller bearings.

4. The differential assembly according to claim 3 wherein at least one of said roller bearings has an inner race, an outer race, and an intermediate roller cage assembly, said casing means being provided with an annular recessed mounting portion for receiving and supporting said outer race, and support means for supporting said inner race relative to said housing.

5. The differential assembly according to claim 4 wherein said housing is provided with an internally threaded bore, and said support means includes a bearing retainer having a reduced outer diameter hub portion for receiving and supporting said inner race and said roller cage assembly, said bearing retainer having an externally threaded portion for engagement with said internally threaded bore in said housing.

6. The differential assembly according to claim 5 wherein said internally threaded bore in said housing is formed of a diameter at least as great as the maximum outer diameter of said roller cage assembly to enable said hub portion of said bearing retainer to be inserted therethrough with said inner race and said roller cage assembly mounted thereon.

7. The differential assembly according to claim 5 including means for locking said bearing retainer in a selected position.

8. A differential assembly comprising:
a housing means;
a casing means for supporting a differential mechanism;
a pair of roller bearing means for rotatably supporting said casing means relative to said housing means;
at least one of said roller bearings having an inner race, an outer race, and an intermediate roller cage assembly;
said casing means provided with an annular recessed mounting portion for receiving and supporting said outer race;
said housing provided with an internally threaded bore;
a bearing retainer having a reduced outer diameter hub portion for receiving and supporting said inner race and said roller cage assembly, said bearing retainer having an externally threaded portion for engagement with said internally threaded bore in said housing;
said internally threaded bore in said housing being formed of a diameter at least as great as the maximum outer diameter of said roller cage assembly to enable said hub portion of said bearing retainer to be inserted therethrough with said inner race and said roller cage assembly mounted thereon.

9. The differential assembly according to claim 8 including means for locking said bearing retainer in a selected position.

10. A method of assembling a differential assembly, comprising the steps of:
(a) providing first and second roller bearings each having an inner race, an outer race, and an intermediate roller cage assembly;
(b) providing a differential casing assembly defining a pair of first and second arcuate recesses adapted to receive the outer races of said first and second roller bearings, the arcuate recesses surrounding the axis of side gears of the differential casing assembly;
(c) providing first and second bearing retaining means for supporting the inner races of said roller bearing;
(d) providing a housing having first and second aligned bores for receiving and supporting said first and second bearing retaining means;
(e) pressing said inner races of said first and second roller bearings onto outer diameter hub portions of said first and second bearing retaining means;
(f) pressing said outer races of said first and second roller bearings into said first and second arcuate recesses in said casing assembly;
(g) positioning said casing assembly having said outer races mounted therein in said housing;
(h) passing said hub portions of said first and second bearing retaining means having said inner races and said roller cage assemblies mounted thereon through said first and second bores to bring said roller cage assemblies into engagement with said outer races; and
(i) securing said first and second bearing retaining means relative to said housing within said first and second bores.

11. The method according to claim 10 wherein step (c) includes providing said first and second bearing retainer means with an externally threaded portion, and step (d) includes providing said first and second housing bores with an internally threaded portion for engagement with said bearing retainer means.

* * * * *